US012669087B1

(12) United States Patent

Ackermann

(10) Patent No.: US 12,669,087 B1
(45) Date of Patent: Jun. 30, 2026

(54) GAS TURBINE ENGINE WITH ENTRAINED PARTICLE SEPARATION SYSTEM AND METHOD

(71) Applicant: RTX Corporation, Farmington, CT (US)

(72) Inventor: William K. Ackermann, East Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/239,595

(22) Filed: Jun. 16, 2025

(51) Int. Cl.
*F02C 7/05* (2006.01)
*F02C 3/00* (2006.01)

(52) U.S. Cl.
CPC .................. *F02C 7/05* (2013.01); *F02C 3/00* (2013.01); *F05D 2260/607* (2013.01)

(58) Field of Classification Search
CPC ....... F02C 7/05; F02C 7/052; F05D 2260/607
See application file for complete search history.

(56) References Cited

U.S. PATENT DOCUMENTS

| | | | | |
|---|---|---|---|---|
| 3,380,711 | A * | 4/1968 | Blattner | F01D 1/08 |
| | | | | 415/206 |
| 7,326,031 | B2 * | 2/2008 | O'Neill | F01D 9/065 |
| | | | | 415/121.2 |
| 8,943,791 | B2 * | 2/2015 | Tibbott | F01D 9/065 |
| | | | | 60/39.092 |
| 9,909,504 | B2 * | 3/2018 | Suciu | F02C 7/052 |

| | | | | |
|---|---|---|---|---|
| 10,774,788 | B2 | 9/2020 | Feulner | |
| 11,834,989 | B1 * | 12/2023 | Loebig | B01D 45/04 |
| 12,258,903 | B1 * | 3/2025 | Loebig | B04C 3/00 |
| 12,326,114 | B2 * | 6/2025 | McCaffrey | F02C 7/04 |
| 2014/0245747 | A1 * | 9/2014 | Pritchard, Jr. | F04D 27/0215 |
| | | | | 60/785 |
| 2015/0159560 | A1 * | 6/2015 | Kumar | F02C 7/30 |
| | | | | 60/785 |
| 2016/0177824 | A1 * | 6/2016 | Ponton | F02C 7/052 |
| | | | | 60/39.092 |
| 2017/0058783 | A1 * | 3/2017 | Tan | F02C 9/18 |
| 2017/0138263 | A1 * | 5/2017 | Duge | B64D 33/02 |
| 2017/0191503 | A1 * | 7/2017 | Pearson | B01D 45/16 |

(Continued)

FOREIGN PATENT DOCUMENTS

| | | | | | |
|---|---|---|---|---|---|
| EP | 3913231 | A1 * | 11/2021 | | F02C 7/05 |
| EP | 4579130 | A2 * | 7/2025 | | F23R 3/04 |

*Primary Examiner* — Craig Kim
(74) *Attorney, Agent, or Firm* — Getz Balich LLC

(57) ABSTRACT

A gas turbine engine is provided that includes fan, compressor, combustion, and turbine sections, and an entrained debris removal system. The compressor section includes a compressor inlet disposed downstream of the fan section. A core gas path begins at the compressor inlet and extends through the compressor section. The bypass air path is disposed downstream of the fan section. The structural member extends radially across the bypass air path. The entrained debris removal system includes an inlet port engaged with the core gas path, a passage that extends through the structural member, and an exit port that is disposed in contact with ambient air. The entrained debris removal system is configured to selectively receive core gas from the core gas path and pass the core gas through the passage that extends through the structural member and out of the exit port.

17 Claims, 6 Drawing Sheets

(56) References Cited

U.S. PATENT DOCUMENTS

| | | | | |
|---|---|---|---|---|
| 2017/0284303 A1* | 10/2017 | Johnson | ................. | F02K 3/075 |
| 2017/0335721 A1* | 11/2017 | Spangler | ................. | F01D 25/32 |
| 2019/0024587 A1* | 1/2019 | Smith, III | ................. | F02C 3/04 |
| 2021/0079840 A1* | 3/2021 | Yan | ................. | B64D 33/02 |
| 2021/0324795 A1* | 10/2021 | Menheere | ................. | B64D 33/02 |
| 2024/0262523 A1* | 8/2024 | Terwilliger | ................. | F02C 7/05 |

* cited by examiner

GAS TURBINE ENGINE WITH ENTRAINED PARTICLE SEPARATION SYSTEM AND METHOD

BACKGROUND OF THE INVENTION

1. Technical Field

The present disclosure relates gas turbine engines in general and to systems and methods for removing entrained particles from an airflow entering a gas turbine engine in particular.

2. Background Information

Particles of various materials such as sand and dust and chemicals that enter a turbine engine can be harmful, for example potentially causing component surface erosion and/or corrosion, clogging of cooling holes and passages, to name a few. A system for removing entrained particles from air passing within an aircraft turbine engine would be useful.

SUMMARY

According to an aspect of the present disclosure, a gas turbine engine is provided that includes a fan section, a compressor section, a combustion section, a turbine section, a core gas path, a bypass gas path, a structural member, and an entrained debris removal system. The compressor section includes a compressor inlet disposed downstream of the fan section. The core gas path begins at the compressor inlet and extends through the compressor, combustion, and turbine sections. The bypass air path is disposed downstream of the fan section and radially outside of the core gas path. The structural member extends radially across the bypass air path. The entrained debris removal system includes an inlet port engaged with the core gas path, a passage that extends through the structural member, and an exit port that is disposed in contact with ambient air. The entrained debris removal system is configured to selectively receive core gas from the core gas path and pass the core gas through the passage that extends through the structural member and out of the exit port.

In any of the aspects or embodiments described herein, the bypass air path (BAP) may be disposed within a nacelle and may be defined by a BAP outer radial structure and a BAP inner radial structure, and the exit port may be engaged with an exterior surface of the BAP outer radial structure.

In any of the aspects or embodiments described herein, the compressor section may include a low pressure compressor (LPC) section and the inlet port may be engaged with the core gas flow path at a position forward of the LPC.

In any of the aspects or embodiments described herein, the core gas flow path between the compressor inlet and the low pressure compressor may be defined by an LPC outer radial structure and an LPC inner radial structure, and the inlet port may be engaged with the LPC outer radial structure.

In any of the aspects or embodiments described herein, the inlet port may include a scoop that extends radially outward from the LPC outer radial structure and into the core gas path.

In any of the aspects or embodiments described herein, the gas turbine engine may include an annular interior compartment that is disposed between the bypass air path and the core gas path. The inlet port may be in fluid communication with the interior compartment and the passage that extends through the structural member may be in fluid communication with the interior compartment.

In any of the aspects or embodiments described herein, the bypass air path (BAP) may be disposed with a nacelle and may be defined by a BAP outer radial structure and a BAP inner radial structure. The core gas flow path (CGFP) between the compressor inlet and the compressor section may be defined by a CGFP outer radial structure and a CGFP inner radial structure, and the inlet port may be engaged with the CGFP outer radial structure.

In any of the aspects or embodiments described herein, the compressor section may include a low pressure compressor section and the inlet port may be engaged with the CGFP outer radial structure at a position forward of the low pressure compressor section.

In any of the aspects or embodiments described herein, the interior compartment may be defined by the BAP inner radial structure, the CGFP outer radial structure, and a firewall that extends between the BAP inner radial structure and the CGFP outer radial structure.

In any of the aspects or embodiments described herein, the entrained debris removal system may include a valve controllable between an open configuration and a closed configuration. In the open configuration the valve permits fluid passage through the valve, and in the closed configuration the valve does not permit fluid passage through the valve. The valve may be disposed in line between the passage that extends through the structural member and the exit port. The valve may be disposed in line between the inlet port and the passage that extends through the structural member. The valve may be integrated into the inlet port.

In any of the aspects or embodiments described herein, the inlet port may be configured as a flush-wall valve.

According to an aspect of the present disclosure, a gas turbine engine is provided that includes a fan section, a compressor section, a combustion section, a turbine section, a core gas path, a bypass gas path, a structural member, and an entrained debris removal system. The compressor section includes a compressor inlet disposed downstream of the fan section. The core gas path begins at the compressor inlet and extends through the compressor, combustion, and turbine sections. The bypass air path is disposed downstream of the fan section and radially outside of the core gas path. The structural member extends radially across the bypass air path. The entrained debris removal system includes an inlet port engaged with the core gas path, a passage that extends through the structural member, an exit port that is disposed in contact with ambient air, a valve, and a controller in communication with the valve and a non-transitory memory storing instructions. The instructions when executed cause the controller to selectively operate the valve between an open configuration and a closed configuration. In the open configuration, the valve permits fluid passage through the valve, and in the closed configuration the valve does not permit fluid passage through the valve.

According to an aspect of the present disclosure, a method of removing entrained particles from an airflow within a gas turbine engine is provided. The gas turbine engine includes a fan section, a compressor section that includes a compressor inlet disposed downstream of the fan section, a combustion section, a turbine section, a core gas path that begins at the compressor inlet and extends through the compressor section, the combustion section, and the turbine section, a bypass air path that is disposed downstream of the fan section and radially outside of the core gas path, and a structural member that extends radially across the bypass air path. The method comprises: providing an inlet port configured to bleed air flow from the core gas path upstream of the compressor section; providing a fluid passage in fluid communication with the inlet port, the fluid passage extending through the structure member and to an exit port that is disposed in contact with ambient air; and controlling a valve between an open configuration and a closed configuration, wherein in the open configuration the valve permits fluid passage from the inlet port, through the valve, and out the exit port, and in the closed configuration the valve does not permit fluid passage through the valve.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
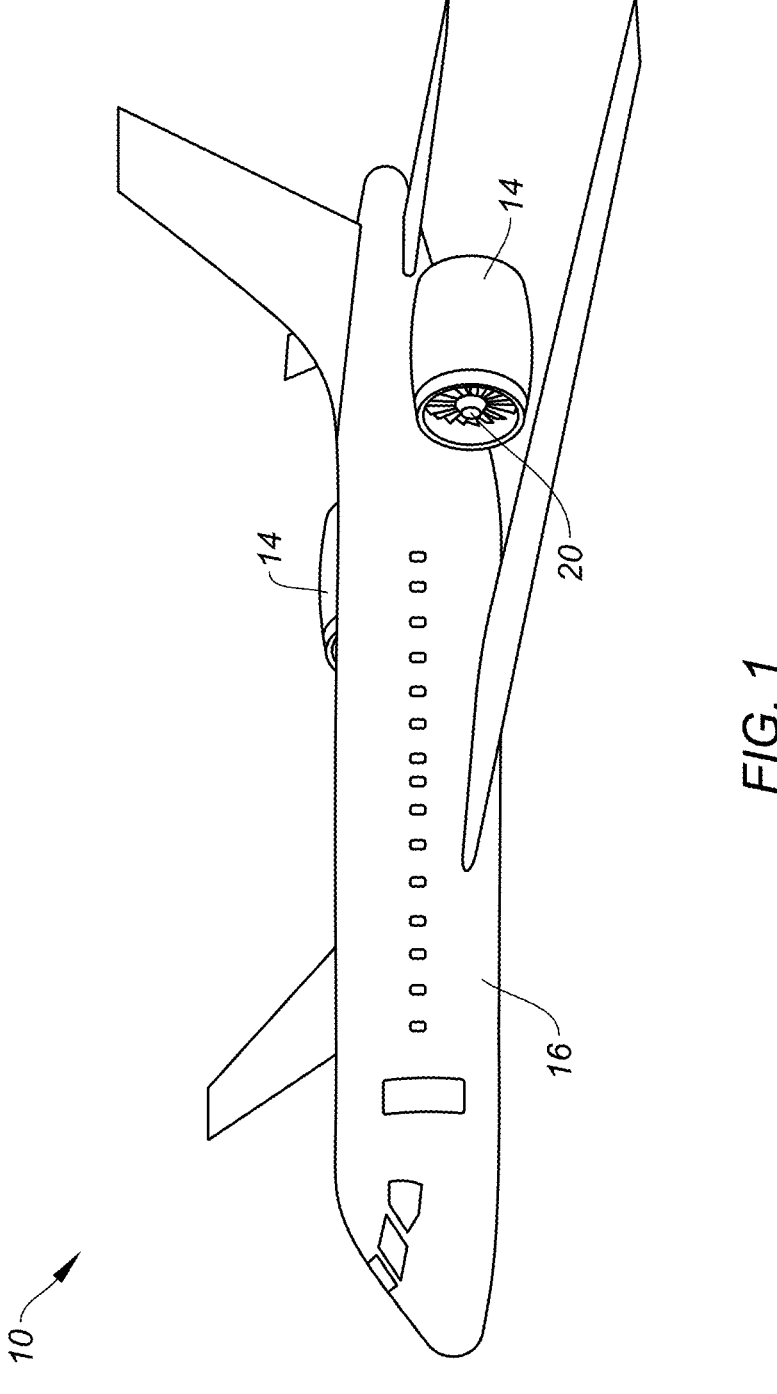
FIG. 1 is a diagrammatic view of an airplane.

FIG. 1 is a diagrammatic view of an aircraft 10 that includes a pair of nacelles 14, and a fuselage 16. A gas turbine engine 20 is disposed in each nacelle 14.

Figure 2:
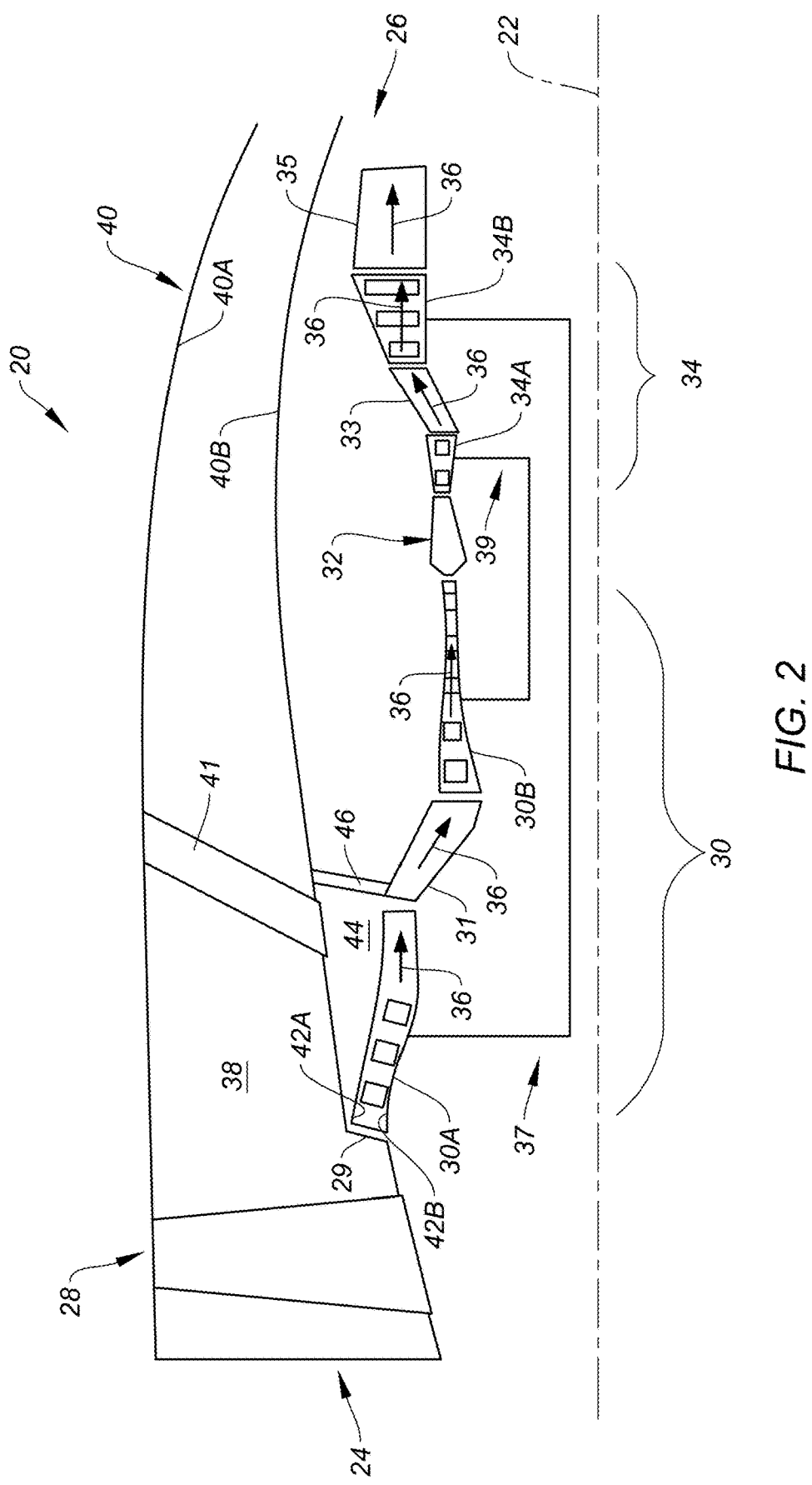
FIG. 2 is a diagrammatic sectional view of a gas turbine engine embodiment.

FIG. 2 shows a diagrammatic view of a gas turbine engine 20. The gas turbine engine 20 extends along an axial centerline 22 between an upstream engine airflow inlet 24 and a downstream engine exhaust 26. The gas turbine engine 20 includes a fan section 28, a compressor section 30, a combustion section 32, and a turbine section 34. The compressor section 30 includes a low-pressure compressor (LPC 30A) and a high-pressure compressor (HPC 30B). An annular compressor inlet 29 is disposed forward of the LPC 30A. In some embodiments, a plurality of front center body (FCB) structures 27 may extend across the core gas path 36 at an axial position between the compressor inlet 29 and the LPC 30A. The FCB structures 27 (not shown in FIG. 2; see FIG. 3) are part of the static support structure of the engine 20 and are circumferentially spaced apart from one another. The turbine section 34 includes a high-pressure turbine (HPT 34A) and a low-pressure turbine (LPT 34B). The engine sections are arranged sequentially along the centerline 22 within an engine housing. The LPC 30A is connected to and driven by the LPT 34B through a low-speed shaft 37. The HPC 30B is connected to and driven by the HPT 34A through a high-speed shaft 39.

The gas turbine engine 20 configuration diagrammatically shown in FIG. 2 is an example provided to facilitate the description herein. The present disclosure may be implemented in a variety of different gas turbine engine 20 configurations and is not therefore limited to the gas turbine engine 20 configuration diagrammatically shown in FIG. 2. For example, the gas turbine engine diagrammatically shown in FIG. 2 is depicted as a twin spool engine having a low-speed shaft 37 and a high-speed shaft 39. The present disclosure may be utilized with single spool engines or three spool engines, or geared turbofan engines, or open rotor engines, or the like.

The terms "forward" and "aft" are used herein to indicate the relative position of a component or surface. In an axial engine like that diagrammatically shown in FIG. 2, the fan section 28 is forward of the compressor section 30 and the turbine section 34 is aft of the compressor section 30. The terms "upstream" and "downstream" used herein refer to the direction of an air/gas flow passing through an annular gas path of the gas turbine engine 20. The terms "inner radial" and "outer radial" refer to relative radial positions from the engine centerline 22. An inner radial component or path is disposed radially closer to the engine centerline 22 than an outer radial component or path.

Air entering the gas turbine engine 20 through the airflow inlet 24 (forward of the fan section 28) is bisected between a core gas path 36 and a fan bypass air path 38. A portion of the air entering the gas turbine engine 20 passes through the fan section 28 and enters the core gas path 36 through the annular compressor inlet 29. The core gas path 36 extends through the LPC 30A, the intermediate case 31, the HPC 30B, the combustion section 32, the HPT 34A, the mid-turbine frame 33, the LPT 34B, and the turbine exhaust case 35. Core gas exiting the LPT 34B exits the engine 20 via the exhaust 26. The segment of the core gas path 36 that extends from the compressor inlet 29 and through the LPC 30A is defined by an outer radial structure (which may be referred to herein as the "LPC outer radial structure 42A") and an inner radial structure (which may be referred to herein as the "LPC inner radial structure 42B"). The remainder of the air entering the gas turbine engine 20 passes through the fan section 28 and enters the fan bypass air path 38 which is disposed radially outside of the core of the engine 20.

The gas turbine engine 20 is diagrammatically shown in FIG. 1 engaged with a nacelle 14. The nacelle 14 is configured to provide an annular region radially outside of the core of the gas turbine engine 20. The annular region (which serves as the fan bypass air path 38) is defined by an outer radial structure 40A and an inner radial structure 40B. In some embodiments, a fan exit guide vane ("FEGV 41") extends between the inner radial structure 40B and the outer radial structure 40A. The outer radial structure 40A has an exterior surface 140 that is exposed to the ambient environment; e.g., air disposed at an ambient pressure (PA). It should be noted that the axial length of the outer radial structure 40A may vary depending upon the application. For example, FIG. 2 diagrammatically illustrates the outer radial structure 40A extending to the axial end of the gas turbine engine 20; e.g., to about the turbine exhaust case 35. In alternative embodiments, the outer radial structure may axially terminate at a forward position; e.g., aft of the FEGVs 41. The present disclosure is not limited to any particular outer radial structure 40A axial length.

The nacelle inner radial structure 40B extends from the annular compressor inlet 29 in an aft direction beyond where the FEGV 41 intersects with the inner radial structure 40B. As can be in FIG. 2, an annular interior compartment 44 is defined by the nacelle inner radial structure 40B, the LPC outer radial structure 42A, and a firewall 46. The firewall 46 extends in a general radial direction between the nacelle inner radial structure 40B and the LPC outer radial structure 42A. The inner radial end of the FEGV 41 is exposed to the interior compartment 44.

Referring to FIGS. 3-6, embodiments of the present disclosure include an entrained debris removal system ("EDM system 48") that includes an inlet port 54, a passage 56 that extends through the FEGV 41, and an exhaust port 58. In some embodiments, the EDM system 48 may include one or more valves 50 that are controllable between an open configuration and a closed configuration. In some embodiments, a controller 52 may be used as part of a valve control system.

The controller 52 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the EDM system 48 (or a system component) to accomplish the same algorithmically and/or coordination of system components. The controller 52 may include or may be in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 52 is shown in the FIGURES and described herein as an independent component to facilitate the description. The controller 52 may alternatively be integrated within another controller present within the gas turbine engine 20 (or aircraft 10) and that controller may be configured to perform the functionality detailed herein. The present disclosure is not limited to any particular controller architecture unless specifically stated herein.

Figure 3:
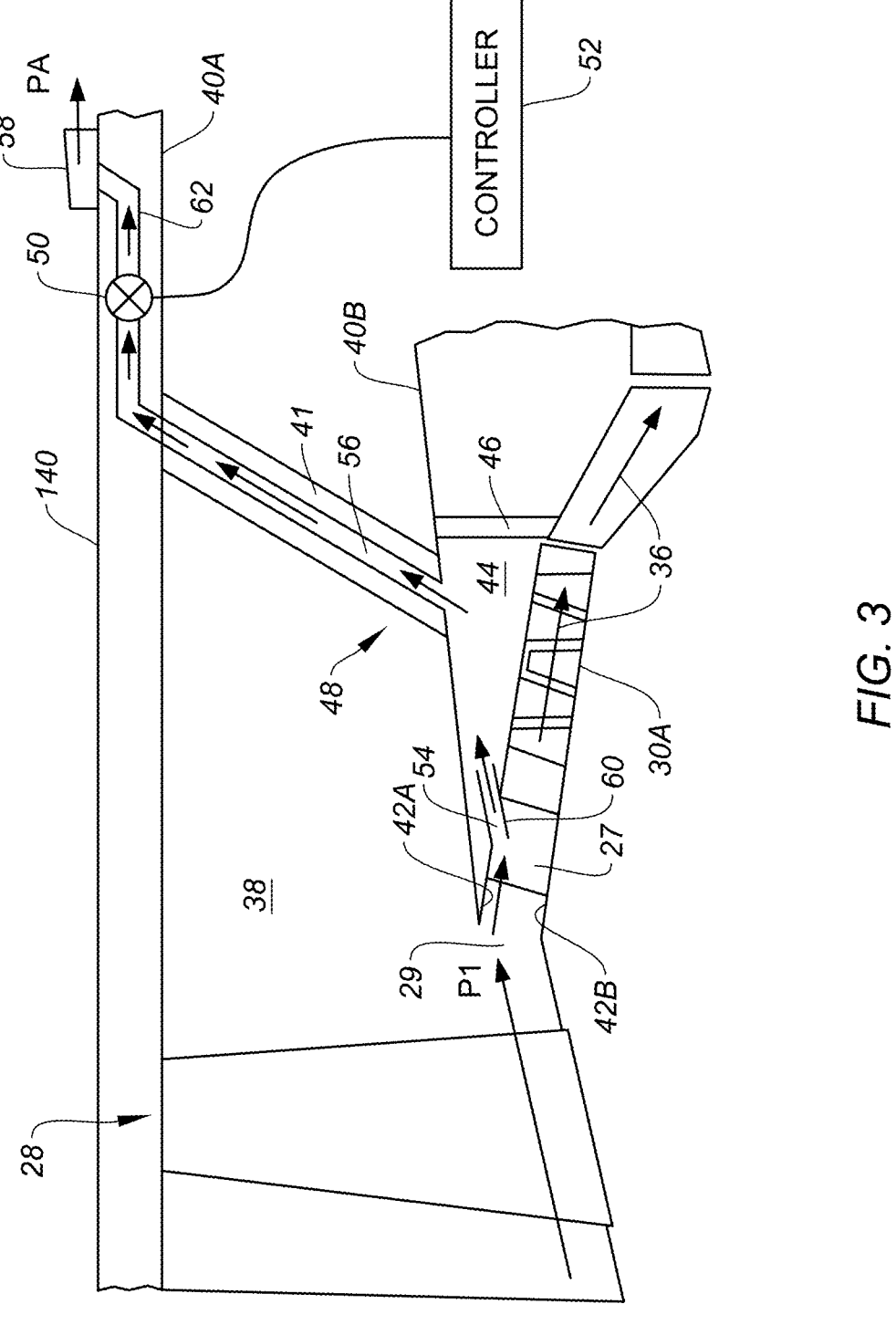
FIG. 3 is a diagrammatic sectional view of a gas turbine engine that includes an embodiment of a present disclosure entrained debris removal system.

An embodiment of a present disclosure EDM system 48 is shown in FIG. 3. In this embodiment, the inlet port 54 is engaged with the LPC outer radial structure 42A at a position forward of the low pressure compressor 30A. The inlet port 54 may include a plurality of scoops 60 extending radially outward from the LPC outer radial structure 42A and into the core gas path 36. In those embodiments that include FCB structures 27, the scoops 60 may be disposed circumferentially between the FCB structures 27 or they may be disposed forward of the FCB structures 27. Each scoop 60 may be in fluid communication with a flow passage that allows the air captured by the scoops 60 to be directed into the interior compartment 44. The air at the inlet to the scoops 60 is at a first pressure (P1). The interior compartment 44 is in fluid communication with the inner radial end of the passage 56 that extends through the FEGV 41. The outer radial end of the passage 56 is in fluid communication with a passage 62 that leads to the exhaust port 58 that is engaged with the exterior surface 140 of the outer radial structure 40A of the nacelle 14. In this embodiment, a valve 50 is disposed in line within the passage 62 that leads to the exhaust port 58. The valve 50 may be controllable to be disposed in an open configuration and a closed configuration. In some embodiments, the valve 50 may be controllable to be disposed in a fully open configuration. In some embodiments, the valve 50 may be controllable to be disposed in an open configuration that is less than fully open; e.g., 25% open, 50% open, 75% open, or the like. The valve 50 may be controllable to be disposed in the closed configuration under certain operating conditions; e.g., to increase thrust and/or increase performance.

As diagrammatically shown in FIG. 3, the LPC outer radial structure 42A is disposed at an angle relative to the likely air flow direction adjacent the compressor inlet 29 such that the airflow is likely to impinge on the LPC outer radial structure 42A. Because the air at the compressor inlet 29 is downstream of the fan section 28, the air is also likely to have a circumferential swirl component. The centrifugal forces acting on the particles within the swirling air flow urge the entrained particles radially outward. As a result, some portion of the entrained particles will radially migrate into the fan bypass air path 38. Another portion of the entrained particles will enter the compressor inlet 29, but will be biased toward the outer radial boundary of the core gas path 36 (i.e., the LPC outer radial structure 42A) where they will encounter the scoops 60. As detailed herein, the air at the inlet to the scoops 60 is at a first pressure (P1) and the air at the exhaust port 58 disposed at the exterior surface 140 of the nacelle 14 is at an ambient pressure (PA). The difference between the air pressure at the inlet to the scoops (P1) and the ambient air pressure at the exhaust port 58 (PA; P1>PA) provides a sufficient motive force to force the air captured by the scoops 60 (and the entrained particles) from the interior compartment 44, into the passage 56 through the FEGV 41, and out the exhaust port 58. The controllable valve 50 allows the system 48 to purge particle entrained air when desired and to eliminate the air flow bleed off of the LPC 30A when the potential for ingesting entrained particles is insignificant.

Figure 4:
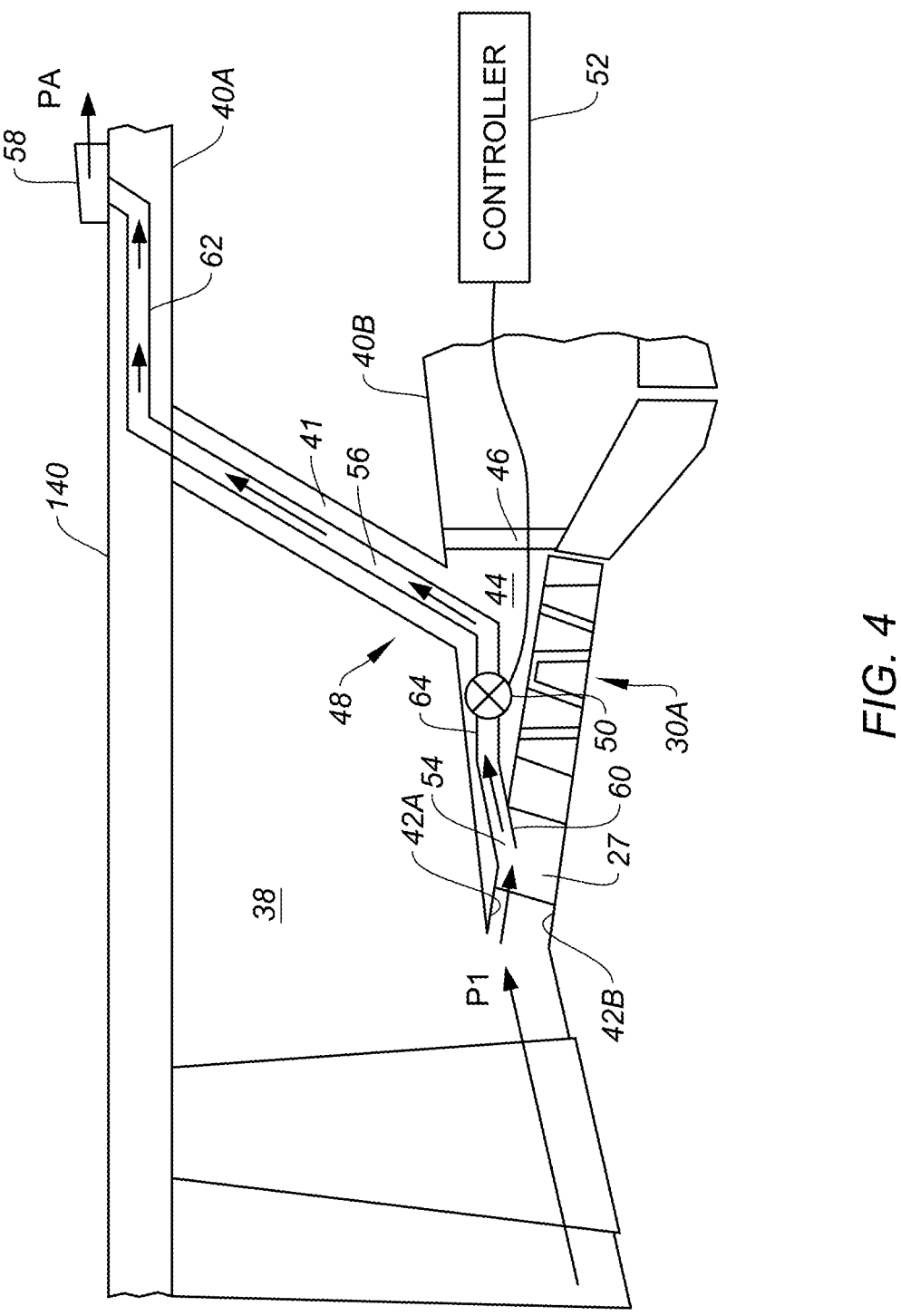
FIG. 4 is a diagrammatic sectional view of a gas turbine engine that includes an embodiment of a present disclosure entrained debris removal system.

Another embodiment of a present disclosure EDM system 48 is shown in FIG. 4. In this embodiment, the inlet port 54 may be similar to that described above and shown in FIG. 3. Each scoop 60 may be in fluid communication with a flow passage that allows the air captured by the scoops 60 to be directed into a passage 64 disposed within the interior compartment 44. The air at the inlet to the scoops 60 is at a first pressure (P1). In this embodiment, the passage 64 disposed in the interior compartment 44 extends to the inner radial end of the passage 56 that extends through the FEGV 41. The outer radial end of the passage 56 is in fluid communication with the passage 62 that leads to the exhaust port 58 that is engaged with the exterior surface 140 of the outer radial structure 40A of the nacelle 14. In this embodiment, a valve 50 is disposed in line within the passage 64 disposed in the interior compartment 44. The valve 50 may be configured as described herein with regard to the embodiment shown in FIG. 3. The air flow characteristics described above, including the difference in pressure across the EDM system 48 (i.e., P1>PA), are applicable to the embodiment shown in FIG. 4.

Figure 5:
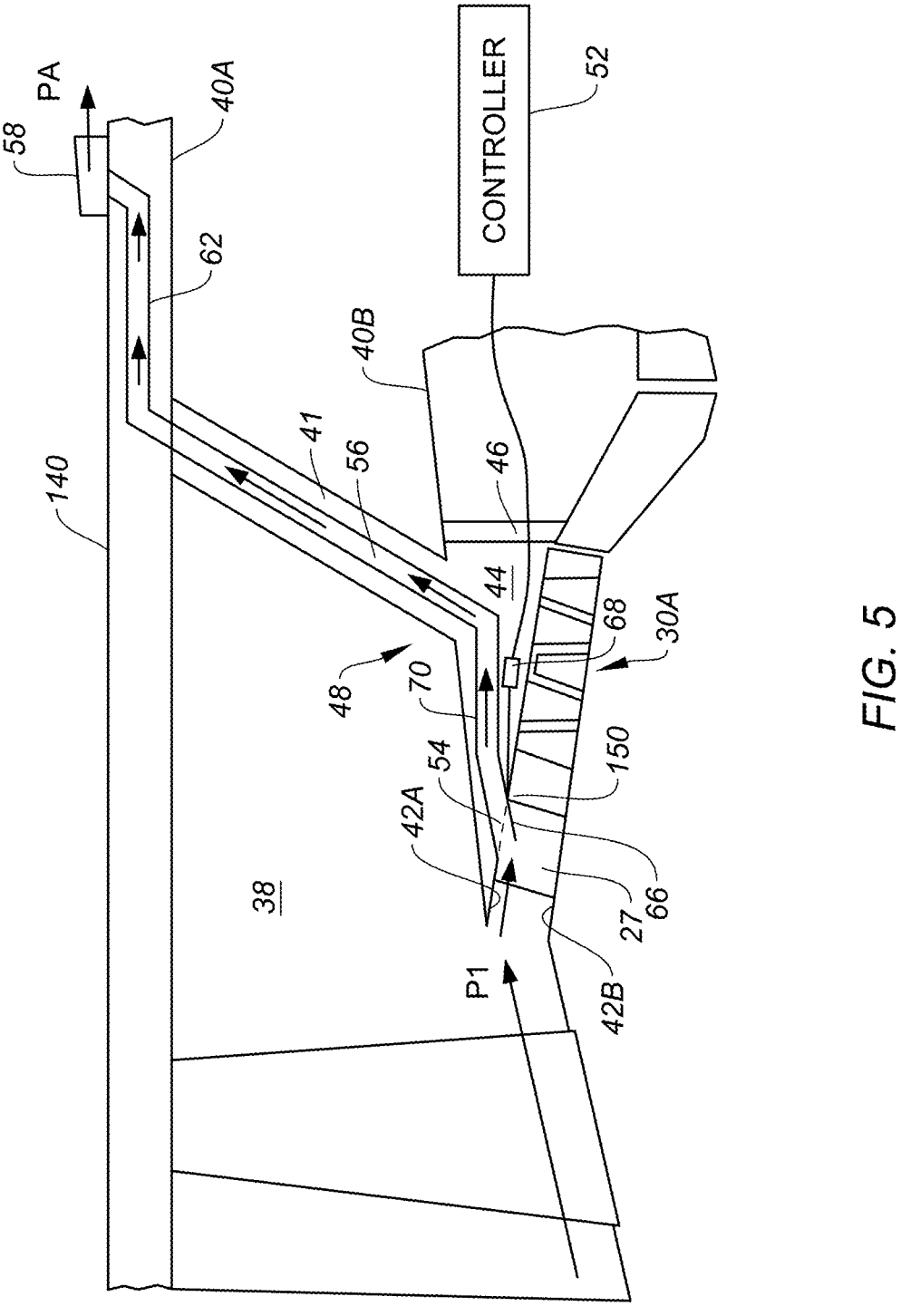
FIG. 5 is a diagrammatic sectional view of a gas turbine engine that includes an embodiment of a present disclosure entrained debris removal system.

Another embodiment of a present disclosure EDM system 48 is shown in FIG. 5. In this embodiment, the inlet port 54 is configured as a valve 150 that is controllable to be disposed in an open configuration and in a closed configuration. The inlet port 54 is shown diagrammatically with a flap 66 and an actuator 68. In some embodiments, the valve 150 may be controllable to be disposed in a fully open configuration. In some embodiments, the valve 150 may be controllable to be disposed in an open configuration that is less than fully open; e.g., 25% open, 50% open, 75% open, or the like. In FIG. 5, the flap 66 is shown in a solid line representative of a fully open configuration and in a dashed line representative of a closed configuration. In the fully open configuration, the flap 66 may function as a scoop. The inlet port 54 is in fluid communication with a flow passage 70 that directs the bled air into the passage 56 disposed within the interior compartment 44, and thereafter through the passage 62 in fluid communication with the exhaust port 58. The air flow characteristics described above, including the difference in pressure across the EDM system 48 (i.e., P1>PA), are applicable to the embodiment shown in FIG. 5.

Figure 6:
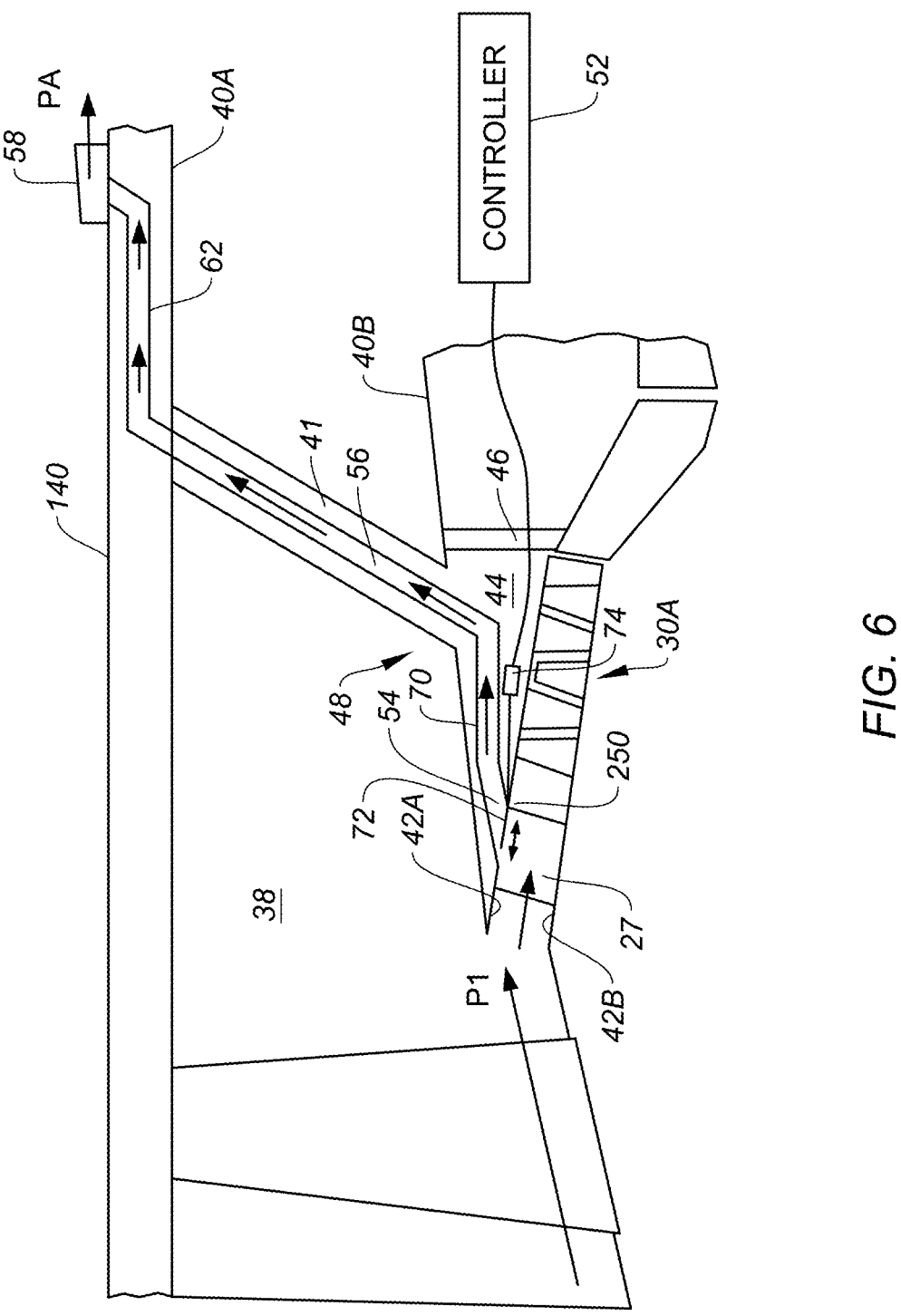
FIG. 6 is a diagrammatic sectional view of a gas turbine engine that includes an embodiment of a present disclosure entrained debris removal system.

Another embodiment of a present disclosure EDM system 48 is shown in FIG. 6. In this embodiment, the inlet port 54 is configured as a valve 250 that is controllable to be disposed in an open configuration and in a closed configuration. The inlet port 54 is shown diagrammatically with a sliding door valve 72 and an actuator 74. The sliding door valve 72 may be described as a "flush-wall" valve because in operation it does not extend into the gas path. Another example of a "flush-wall" valve is one that has a flap that pivots inwardly, away from the gas path. In some embodiments, the sliding door valve 72 may be controllable to be disposed in a fully open configuration. In some embodiments, the sliding door valve 72 may be controllable to be disposed in an open configuration that is less than fully open; e.g., 25% open, 50% open, 75% open, or the like. The inlet port 54 is in fluid communication with a flow passage 70 that directs the bled air into the passage 56 disposed within the interior compartment 44, and thereafter through the passage 62 in fluid communication with the exhaust port 58.

As described herein, embodiments of the present disclosure may benefit from the appreciable difference in pressure between the air at the inlet to the scoops 60 (i.e., at P1) and the air at the exhaust port 58 (i.e., at PA). In some applications, the exhaust port 58 may be configured to accomplish the functionality described herein and may be configured to produce some thrust recovery as a result of the difference in pressure.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The gas turbine engine 20 configuration diagrammatically shown in FIG. 2 is an example provided to facilitate the description herein. The present disclosure may be implemented in a variety of different gas turbine engine configurations and is not therefore limited to the gas turbine engine 20 configuration diagrammatically shown in FIG. 1. For example, in some gas turbine engine configurations the fan section 28 may be connected to a geared architecture (not shown) through a fan shaft.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine, comprising:
   a fan section;
   a compressor section that includes a compressor inlet disposed downstream of the fan section;
   a combustion section;

a turbine section;

a core gas path that begins at the compressor inlet and extends through the compressor section, the combustion section, and the turbine section;

a bypass air path that is disposed downstream of the fan section and radially outside of the core gas path;

a structural member that extends radially across the bypass air path; and an entrained debris removal system that includes an inlet port engaged with the core gas path, a passage that extends through the structural member, and an exit port that is disposed in contact with ambient air;

wherein the entrained debris removal system is configured to selectively receive core gas from the core gas path and pass the core gas through the passage that extends through the structural member and out of the exit port;

wherein the compressor section includes a low pressure compressor (LPC) section and the inlet port is engaged with the core gas flow path at a position forward of the LPC section.

2. The gas turbine engine of claim 1, wherein the bypass air path (BAP) is disposed within a nacelle and is defined by a BAP outer radial structure and a BAP inner radial structure, wherein the exit port is engaged with an exterior surface of the BAP outer radial structure.

3. The gas turbine engine of claim 1, wherein the core gas flow path between the compressor inlet and the LPC section is defined by an LPC outer radial structure and an LPC inner radial structure, and wherein the inlet port is engaged with the LPC outer radial structure.

4. The gas turbine engine of claim 3, wherein the inlet port includes a scoop that extends radially outward from the LPC outer radial structure and into the core gas path.

5. The gas turbine engine of claim 1, further comprising an annular interior compartment that is disposed between the bypass air path and the core gas path, wherein the inlet port is in fluid communication with the interior compartment and the passage that extends through the structural member is in fluid communication with the interior compartment.

6. The gas turbine engine of claim 5, wherein the bypass air path (BAP) is disposed with a nacelle and is defined by a BAP outer radial structure and a BAP inner radial structure; and wherein the core gas flow path (CGFP) between the compressor inlet and the compressor section is defined by a CGFP outer radial structure and a CGFP inner radial structure, and wherein the inlet port is engaged with the CGFP outer radial structure.

7. The gas turbine engine of claim 6, wherein the inlet port is engaged with the CGFP outer radial structure at a position forward of the LPC section.

8. The gas turbine engine of claim 7, wherein the interior compartment is defined by the BAP inner radial structure, the CGFP outer radial structure, and a firewall that extends between the BAP inner radial structure and the CGFP outer radial structure.

9. The gas turbine engine of claim 1, wherein the entrained debris removal system includes a valve controllable between an open configuration and a closed configuration, wherein in the open configuration the valve permits fluid passage through the valve, and in the closed configuration the valve does not permit fluid passage through the valve.

10. The gas turbine engine of claim 9, wherein the valve is disposed in line between the passage that extends through the structural member and the exit port.

11. The gas turbine engine of claim 9, wherein the valve is disposed in line between the inlet port and the passage that extends through the structural member.

12. The gas turbine engine of claim 9, wherein the valve is integrated into the inlet port.

13. The gas turbine engine of claim 1, wherein the inlet port is configured as a flush-wall valve.

14. A gas turbine engine, comprising:

a fan section;

a compressor section that includes a compressor inlet disposed downstream of the fan section;

a combustion section;

a turbine section;

a core gas path that begins at the compressor inlet and extends through the compressor section, the combustion section, and the turbine section;

a bypass air path that is disposed downstream of the fan section and radially outside of the core gas path;

a structural member that extends radially across the bypass air path; and an entrained debris removal system that includes an inlet port engaged with the core gas path, a passage that extends through the structural member, an exit port that is disposed in contact with ambient air, a valve, and a controller in communication with the valve and a non-transitory memory storing instructions, which instructions when executed cause the controller to selectively operate the valve between an open configuration and a closed configuration, wherein in the open configuration the valve permits fluid passage through the valve, and in the closed configuration the valve does not permit fluid passage through the valve;

wherein the compressor section includes a low pressure compressor (LPC) section; and wherein the core gas flow path between the compressor inlet and the low pressure compressor is defined by an LPC outer radial structure and an LPC inner radial structure;

wherein the inlet port includes a scoop that extends radially outward from the LPC outer radial structure and into the core gas path.

15. The gas turbine engine of claim 14, wherein the bypass air path (BAP) is disposed within a nacelle and is defined by a BAP outer radial structure and a BAP inner radial structure, wherein the exit port is engaged with an exterior surface of the BAP outer radial structure.

16. A method of removing entrained particles from an airflow within a gas turbine engine, wherein the gas turbine engine includes a fan section, a compressor section that includes a compressor inlet disposed downstream of the fan section, a combustion section, a turbine section, a core gas path that begins at the compressor inlet and extends through the compressor section, the combustion section, and the turbine section, a bypass air path that is disposed downstream of the fan section and radially outside of the core gas path, and a structural member that extends radially across the bypass air path, the method comprising:

providing an inlet port configured to bleed air flow from the core gas path upstream of the compressor section;

providing a fluid passage in fluid communication with the inlet port, the fluid passage extending through the structure member and to an exit port that is disposed in contact with ambient air; and controlling a valve between an open configuration and a closed configuration, wherein in the open configuration the valve permits fluid passage from the inlet port, through the valve, and out the exit port, and in the closed configuration the valve does not permit fluid passage through the valve;

wherein the bypass air path (BAP) is disposed within a nacelle and is defined by a BAP outer radial structure and a BAP inner radial structure, wherein the exit port is engaged with an exterior surface of the BAP outer radial structure.

17. The method of claim 16, wherein the compressor section includes a low pressure compressor (LPC) section; and wherein the core gas flow path between the compressor inlet and the LPC section is defined by an LPC outer radial structure and an LPC inner radial structure, and wherein the inlet port is engaged with the LPC outer radial structure.

* * * * *